J. D. CROSSLEY.
FEEDING DEVICE FOR SCREW MACHINES.
APPLICATION FILED MAY 1, 1919.
1,367,589.
Patented Feb. 8, 1921.
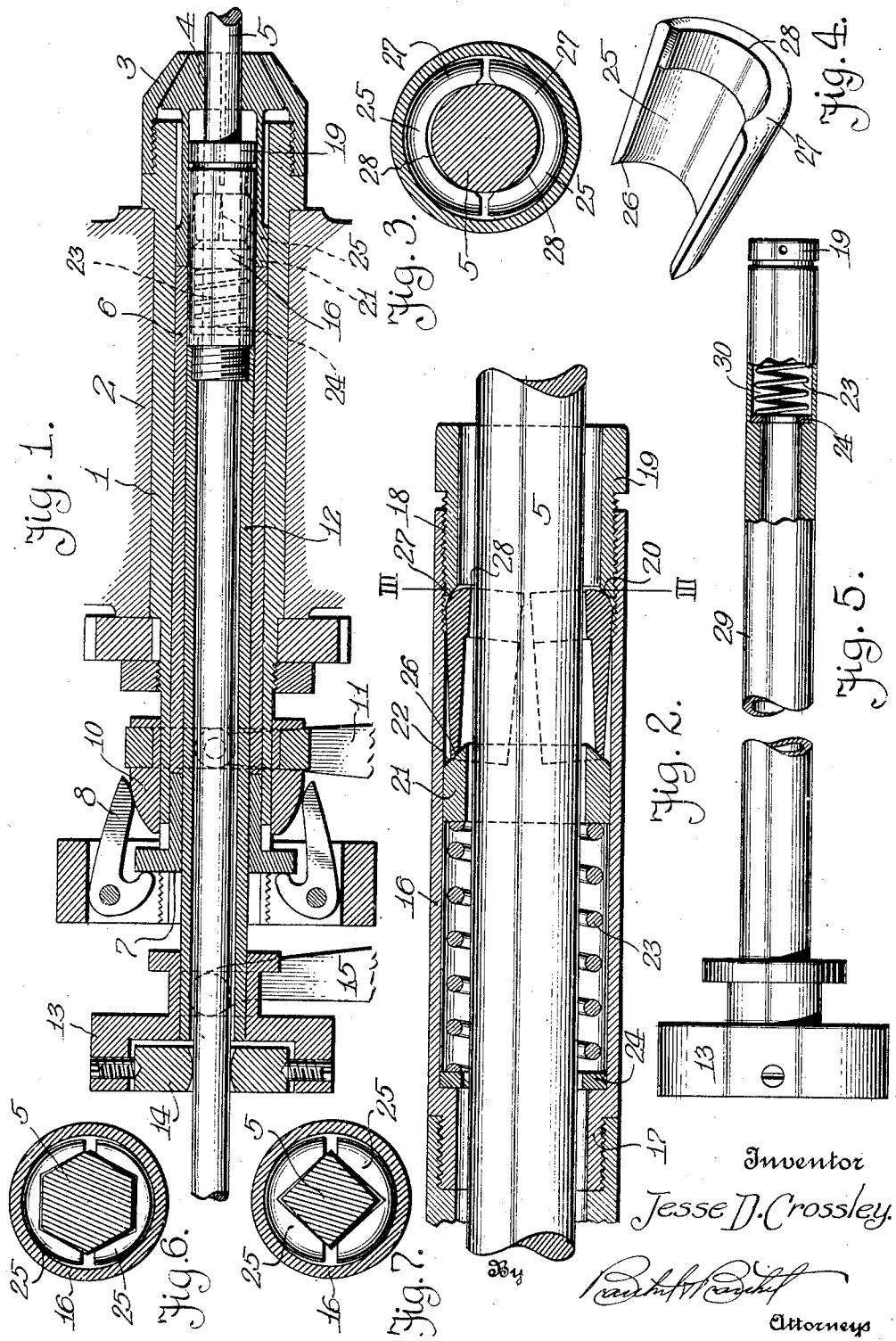
Inventor
Jesse D. Crossley.

UNITED STATES PATENT OFFICE.

JESSE D. CROSSLEY, OF REDFORD, MICHIGAN.

FEEDING DEVICE FOR SCREW-MACHINES.

1,367,589.  Specification of Letters Patent.  Patented Feb. 8, 1921.

Application filed May 1, 1919. Serial No. 293,934.

*To all whom it may concern:*

Be it known that I, JESSE D. CROSSLEY, a citizen of the United States of America, residing at Redford, in the county of Wayne and State of Michigan, have invented certain new and useful Improvements in Feeding Devices for Screw-Machines, of which the following is a specification, reference being had therein to the accompanying drawings.

Single and multiple spindle automatic machines used for performing various kinds of operations on a piece of work include a tubular or hollow spindle through which the piece of work may be intermittently advanced and fed, so that a portion of the piece of work will be presented for an operation, may be cut off and then another portion of a piece of work advanced for another operation. To accomplish this the tubular or hollow spindle of the machine includes a clutch and a pushing device, both of which are disposed and operated in timed relation for advancing and holding a piece of work. Associated with these devices is ordinarily a gripping device for the piece of work which consists of a tube through which the piece of work is shifted, said tube having the ends thereof slitted or bifurcated to provide resilient arms that frictionally engage the piece of work and prevent accidental displacement thereof in the tube. The resilient arms, due to constant use, soon lose their gripping power and must be repeatedly tempered or otherwise repaired, thus requiring considerable labor and time, besides interfering with operations being expeditiously carried on due to the fact that a piece of work will often slip in the gripping device.

The object of my invention is to provide a novel automatic feeding device that may be readily substituted for the gripping device mentioned above, and this is accomplished without material change or modification in the usual automatic machine. My feeding device is positive in its operation, free from injury by ordinary use, and highly efficient for expediting operations in connection with an automatic machine.

The construction of the feeding device as associated with other parts of a spindle of an automatic machine will be hereinafter specifically described and then claimed, and reference will now be had to the drawing, wherein—

Figure 1 is a longitudinal sectional view of the spindle of an automatic machine, provided with a feeding device in accordance with my invention, the device being shown in elevation;

Fig. 2 is an enlarged longitudinal sectional view of the device;

Fig. 3 is a cross sectional view taken on the line III—III of Fig. 2;

Fig. 4 is a perspective view of a detached gripping member;

Fig. 5 is a side elevation of a modified form of spindle, provided with the device, said spindle being partly broken away and partly in section, and Figs. 6 and 7 are cross sectional views of the device illustrating members adapted for pieces of work of different cross-sectional shape.

In order that the position and use of my feeding device may be understood in connection with the spindle of an automatic machine, I have deemed it necessary to show a tubular spindle 1 as journaled in the bearing 2 of an automatic machine. The outer end of the tubular spindle 1 has a chuck including a nose piece 3 and a collet or chuck members 4 which when contracted is adapted to grip and hold a piece of work 5 axially of the spindle 1, said piece of work in this instance being a rod that may be fed or intermittently advanced through the spindle 1 so that the outer end of the rod may have operations performed thereon.

In the spindle 1 is a chuck sleeve 6 abutting the collet or chuck members 4 and adapted to shift the same against the nose piece 3 and contract the collet or chuck members about the piece of work. The inner end of the chuck sleeve 6 is engaged by a head 7 actuated by pivoted fingers 8 in a holder 9, and said fingers are shifted by a cam 10 slidable on the inner end of the spindle 1 and actuated through the medium of a lever 11. The lever 11 may be shifted to impart movement to the fingers 8, the head 7, the sleeve 6 and the collet or chuck members 4, so that the piece of work may be gripped and held, or released as occasion may demand.

In the chuck sleeve 6 is a pusher sleeve 12 and it is axially of this pusher sleeve that the piece of work 5 extends. The inner end of the pusher sleeve 12 is provided with a center guide including a holder 13 for fulcrum jaws 14, and said center guide and the sleeve 12 are actuated through the medium of a lever 15 which is adapted to be operated in timed relation to the lever 11. In other words, when the outer chuck is retracted, to release the piece of work the center guide may grip the piece of work and center and steady while being advanced in the pusher sleeve 12, and as heretofore mentioned, the pusher sleeve 12 has been constructed with a split end so as to afford a gripping device that would alternately grip the piece of work 5 and advance it while centered in the center guide. Instead of using such a pusher sleeve, I provide the outer end thereof with a novel feeding device and by reference to Fig. 1, it will be noted that the device is connected to the outer end of the pusher sleeve 12 and extends out of the chuck sleeve 6 into the collet 4.

My improved feeding device comprises a tubular housing 16 having the inner end thereof reduced and exteriorly screw-threaded, as at 17, so that it may be screwed into the outer end of the pusher sleeve 12 as best seen in Fig. 2. The outer end of the housing 16 is interiorly screwthreaded, as at 18, and adjustably mounted therein is an abutment member 19 having the inner end thereof inwardly beveled, as at 20.

Slidable in the housing 16 is a collar 21 provided with a conical or beveled end 22, and interposed between said collar and the inner end of the housing is a coiled compression spring 23 providing sufficient clearance for the piece of work 5, so that the piece of work may extend axially of the housing. The inner end of the compression spring 23 bears against a wear washer or plate 24, and the expansive force of said spring normally holds the collar 21 advanced toward the abutment member 19, and permits of the collar receding.

Interposed between the abutment member 19 and the collar 21 are two loose semi-cylindrical gripping members 25 having the inner ends thereof beveled, as at 26, to engage the conical or beveled end 22 of the collar 21, while the outer ends of the gripping members 25 are rounded, as at 27, and provided with gripping edges 28. The gripping members 25 are loose within the housing so that said gripping members may automatically adjust themselves relative to the piece of work 5, that is, when the housing 16 is shifted forward to advance a piece of work 5 the gripping members assume a position at an angle to the piece of work and by biting into the piece of work cause it to be moved with the housing. The gripping devices are arranged so that the closing of the chuck takes place when the reciprocating feed tube is at the forward end of its movement. When the chuck is closed, the gripping members merely slip on the work during the return movement of the feed tube and it is during this movement that there is a tendency for the collar 21 to move away from the ends 26 of the gripping members, thus releasing the pressure of said members on the piece of work. This continues until the feed is at the outer end of its movement, and on its forward movement the gripping members are open, otherwise, the gripping members would slip idly over the piece of work, as the grip of the chuck is always greater than the feed or gripping members. With the chuck open the frictional resistance of the gripping members against the piece of work is sufficient to move it, and as the forward movement begins, the tube acting through the spring tends to separate the ends 26 of the gripping members and thus force said members into frictional contact with the piece of work, sufficiently to force the latter with it. The spring gives a yielding action and compensates for the wear of the parts, and this continues until the forward movement is completed and the chuck is again closed and the feed tube returns to its starting position.

As shown in Figs. 6 and 7, the gripping members may be other shapes than semi-cylindrical so as to grip pieces of work of different cross-sectional area or shape.

A slight modification of my invention is illustrated in Fig. 5, wherein a pusher sleeve has its outer end constructed as at 30, to accommodate a slip feeding device in accordance with my invention, whereas in the preferred form of construction the feeding device may be made as a unit and the usual pusher sleeve removed and adapted to receive the device as a unit.

From the foregoing, it will be observed that the inner feeding device will coöperate with the chuck in positively holding a piece of work particularly when the piece of work reaches its inner extremity and is about to pass out of engagement with the work holder. With the inner feeding device very close to the chuck a very small piece of work can be held so that operations can be safely performed thereon, and while I have herein shown the preferred embodiments for accomplishing this result, it is to be understood that the structural elements are susceptible to such changes as fall within the scope of the appended claims.

What I claim is:—

1. A feeding device for the purpose specified comprising a housing, an abutment member in one end of said housing, loose semi-cylindrical gripping members adapted to embrace a piece of work and having the outer ends thereof fulcrumed on said abutment member, and the inner ends thereof beveled, and a spring pressed collar engaging the inner beveled ends of said gripping members and adapted to separate said beveled ends to shift said gripping members relative to said abutment member.

2. A feeding device for the purpose specified comprising loose semi-cylindrical gripping members having gripping edges adapted to embrace and engage a piece of work, an abutment member against which the outer ends of said gripping members engage, a collar adapted to change the position of said gripping members by separating the inner ends of said gripping members, and means inclosing said collar, gripping members and abutment member.

3. The combination of a pusher sleeve, self adjusting semi-cylindrical gripping members at the end of said sleeve adapted to embrace a piece of work, and means engaging the ends of said gripping members adapted to change the angularity thereof when the piece of work is shifted.

In testimony whereof I affix my signature in the presence of two witnesses.

JESSE D. CROSSLEY.

Witnesses:
KARL H. BUTLER,
ANNA M. DORR.